(12) United States Patent
Narayana et al.

(10) Patent No.: US 12,458,737 B2
(45) Date of Patent: Nov. 4, 2025

(54) PERITONEAL DIALYSIS CYCLER-CASSETTE INTERFACE

(71) Applicant: MOZARC MEDICAL US LLC, Minneapolis, MN (US)

(72) Inventors: Rathnakara Narayana, Bangalore (IN); Rajkumar Vp, Dindigul (IN)

(73) Assignee: MOZARC MEDICAL US LLC, Minneapolis, MN (US)

( * ) Notice: Subject to any disclaimer, the term of this patent is extended or adjusted under 35 U.S.C. 154(b) by 1193 days.

(21) Appl. No.: 17/317,555

(22) Filed: May 11, 2021

(65) Prior Publication Data
US 2022/0362447 A1    Nov. 17, 2022

(51) Int. Cl.
*A61M 1/14* (2006.01)
*A61M 1/28* (2006.01)

(52) U.S. Cl.
CPC .......... *A61M 1/159* (2022.05); *A61M 1/1524* (2022.05); *A61M 1/154* (2022.05); *A61M 1/1565* (2022.05); *A61M 1/28* (2013.01); *A61M 2205/12* (2013.01); *A61M 2205/128* (2013.01); *A61M 2210/1017* (2013.01)

(58) Field of Classification Search
CPC .......... A61M 1/14; A61M 1/15; A61M 1/152; A61M 1/1524; A61M 1/154; A61M 1/155; A61M 1/156; A61M 1/1562; A61M 1/1565; A61M 1/159; A61M 1/28; A61M 2205/12; A61M 2205/121; A61M 2205/123; A61M 2205/128; A61M 2210/1017
See application file for complete search history.

(56) References Cited

U.S. PATENT DOCUMENTS

| | | | |
|---|---|---|---|
| 8,137,553 B2 | 3/2012 | Fulkerson | |
| 9,295,772 B2 | 3/2016 | Fulkerson | |
| 9,623,165 B2 | 4/2017 | Jansson | |
| 9,968,725 B2 | 5/2018 | Fulkerson | |
| 2010/0312172 A1* | 12/2010 | Hoffman | A61M 1/155 604/28 |
| 2013/0006171 A1* | 1/2013 | Griessmann | A61M 1/166 604/29 |
| 2020/0041021 A1* | 2/2020 | Moss | A61M 1/154 |

FOREIGN PATENT DOCUMENTS

EP    2931331 B1    10/2015

* cited by examiner

*Primary Examiner* — Shefali D Patel

(57) ABSTRACT

Systems, methods, and devices directed to a peritoneal dialysis cassette and an interface between the cassette and a peritoneal dialysis system is provided. The peritoneal dialysis cassette can include one or more fluid flow paths connecting a plurality of inlet/outlet ports, one or more rotary valves for selectively directing fluid through the peritoneal dialysis cassette, and a pump.

15 Claims, 15 Drawing Sheets

PERITONEAL DIALYSIS CYCLER-CASSETTE INTERFACE

FIELD

A peritoneal dialysis cassette and an interface between the cassette and a peritoneal dialysis system is provided. The peritoneal dialysis cassette can include one or more fluid flow paths connecting a plurality of inlet/outlet ports, one or more rotary valves for selectively directing fluid through the peritoneal dialysis cassette, and a pump.

BACKGROUND

Conventional peritoneal dialysis systems often use a cassette to direct and control fluid movement for the generation of peritoneal dialysis fluid and delivery of peritoneal dialysis therapy. Often, the known systems rely on cassettes having at least one flexible membrane surface upon which an occlusive pressure can be exerted. Conventional actuators act on the membrane to block or occlude portions of the interior flow paths to control the direction of fluid movement. To maintain sterility of the fluid passing through the cassettes, the known systems sometimes rely on a complex set of valves, sensors and other features acting upon a surface of the known cassettes to direct flow. The conventional components do not contact the fluid but rather interact via the membrane surface, which is designed to withstand repeatable and cyclic force upon the membrane surface. As such, the known cassettes require a thin, tough, and elastic surface capable of forming a seal while repeatedly underdoing cyclic pressures. The membrane requirements can be challenging and expensive.

As such, there is a need for systems, methods, and components that do not require occlusive pressure to direct flow. The need extends to avoiding a complex pneumatic pumping system to provide a motive force and direct flow. The related need includes a peritoneal dialysis cassette that can direct fluid without a complex and expensive system. The need extends to cassettes and valves that can operate to selectively direct fluid through a cassette. Further, there is a need for systems and methods for connecting a rigid cassette to a peritoneal dialysis system. The need includes a system for directing fluid flow in a contactless manner that avoids a complex system of valves, sensors, and other features to direct and flow. The related need is for a cassette and related devices and components that do not require a flexible membrane upon which a force is exerted to block fluid flow and thereby direct and control fluid movement.

SUMMARY OF THE INVENTION

The problem to be solved is the movement of fluid through a peritoneal dialysis cassette for any functions performed with a peritoneal dialysis system. The solution is to include one or more rotary valves connectable to servo motors in the cassette and to control the rotary valves to selectively direct fluid throughout the peritoneal dialysis system.

The first aspect relates to a peritoneal dialysis cassette. In any embodiment, the peritoneal dialysis cassette can include a rigid housing; the rigid housing enclosing one or more flow paths, one or more rotary valves, and one or more pumps; the one or more rotary valves extending through at least a first surface of the rigid housing; the one or more rotary valves engageable with one or more servo motors connected to a peritoneal dialysis cycler.

In any embodiment, the one or more flow paths can fluidly connect at least two inlet/outlet ports; the one or more rotary valves selectively directing fluid through the one or more flow paths from a first specified inlet/outlet port to a second specified inlet/outlet port.

In any embodiment, the rigid housing can include a first rigid surface and a second rigid surface.

In any embodiment, the first rigid surface can be connected to the second rigid surface by welding . . . .

In any embodiment, the peritoneal dialysis cassette can include at least one opening in the rigid housing for a membrane of a pressure sensor; the at least one opening in at least one of the one or more flow paths.

The features disclosed as being part of the first aspect can be in the first aspect, either alone or in combination, or follow any arrangement or permutation of any one or more of the described elements. Similarly, any features disclosed as being part of the first aspect can be in a second, third, or fourth aspect described below, either alone or in combination, or follow any arrangement or permutation of any one or more of the described elements.

The second aspect relates to a system. In any embodiment, the system can include the peritoneal dialysis cassette of the first aspect, and a peritoneal dialysis cycler; wherein the one or more servo motors of the peritoneal dialysis cycler are insertable into the one or more rotary valves.

In any embodiment, the system can include a control system; the control system in communication with the one or more servo motors to selectively direct fluid through the one or more flow paths.

In any embodiment, the system can include a motor connected to the one or more pumps.

In any embodiment, the motor can be connected to the peritoneal dialysis cycler.

In any embodiment, the motor can be a stepper motor.

In any embodiment, the peritoneal dialysis cycler can include a patient line fluidly connectable to a catheter; the patient line fluidly connectable to a first inlet/outlet port of the peritoneal dialysis cassette; and a second inlet/outlet port of the peritoneal dialysis cassette can be fluidly connectable to a peritoneal dialysis fluid bag; the first inlet/outlet port and second inlet/outlet port fluidly connectable through at least one of the one or more rotary valves.

In any embodiment, the peritoneal dialysis cycler can include a patient line fluidly connectable to a catheter; the patient line fluidly connectable to a first inlet/outlet port of the peritoneal dialysis cassette; and a second inlet/outlet port of the peritoneal dialysis cassette can be fluidly connectable to a drain line; the first inlet/outlet port and second inlet/outlet port fluidly connectable through at least one of the one or more rotary valves.

In any embodiment, the peritoneal dialysis cycler can include at least one peritoneal dialysis fluid source fluidly connected to a first inlet/outlet port of the peritoneal dialysis cassette; and a second inlet/outlet port of the peritoneal dialysis cassette can be fluidly connectable to a peritoneal dialysis fluid bag; the first inlet/outlet port and second inlet/outlet port fluidly connectable through at least one of the one or more rotary valves.

The features disclosed as being part of the second aspect can be in the second aspect, either alone or in combination, or follow any arrangement or permutation of any one or more of the described elements. Similarly, any features disclosed as being part of the second aspect can be in the first, third, or fourth aspect, either alone or in combination, or follow any arrangement or permutation of any one or more of the described elements.

The third aspect relates to a method. In any embodiment, the method can include the steps of connecting the peritoneal dialysis cassette the first aspect to the peritoneal dialysis cycler by engaging the one or more rotary valves with the one or more servo motors.

In any embodiment, the method can include engaging the one or more pumps with one or more stepper motors connected to the peritoneal dialysis cycler.

In any embodiment, the method can include selectively directing fluid through the one or more flow paths to perform peritoneal dialysis therapy on a patient.

The features disclosed as being part of the third aspect can be in the third aspect, either alone or in combination, or follow any arrangement or permutation of any one or more of the described elements. Similarly, any features disclosed as being part of the third aspect can be in the first, second, or fourth aspect, either alone or in combination, or follow any arrangement or permutation of any one or more of the described elements.

The fourth aspect relates to a method using the system of the second aspect. In any embodiment, the method can include the steps of selectively directing fluid from a peritoneal dialysis fluid bag through a first inlet/outlet port of the peritoneal dialysis cassette and the one or more flow paths to a second inlet/outlet port of the peritoneal dialysis cassette and into a patient line fluidly connected to a catheter.

In any embodiment, the method can include the step of draining fluid from a patient, through the patient line, the second inlet/outlet port of the peritoneal dialysis cassette and to a drain line through a third inlet/outlet port of the peritoneal dialysis cassette.

In any embodiment, the method can include the step of selectively directing fluid from at least one peritoneal dialysis fluid source through a third inlet/outlet port of the peritoneal dialysis cassette to the first inlet/outlet port of the peritoneal dialysis cassette and to the peritoneal dialysis fluid bag prior to selectively directing fluid from the peritoneal dialysis fluid bag to the patient line.

The features disclosed as being part of the fourth aspect can be in the fourth aspect, either alone or in combination, or follow any arrangement or permutation of any one or more of the described elements. Similarly, any features disclosed as being part of the fourth aspect can be in the first, second, or third aspect, either alone or in combination, or follow any arrangement or permutation of any one or more of the described elements.

DETAILED DESCRIPTION

Figure 1A:
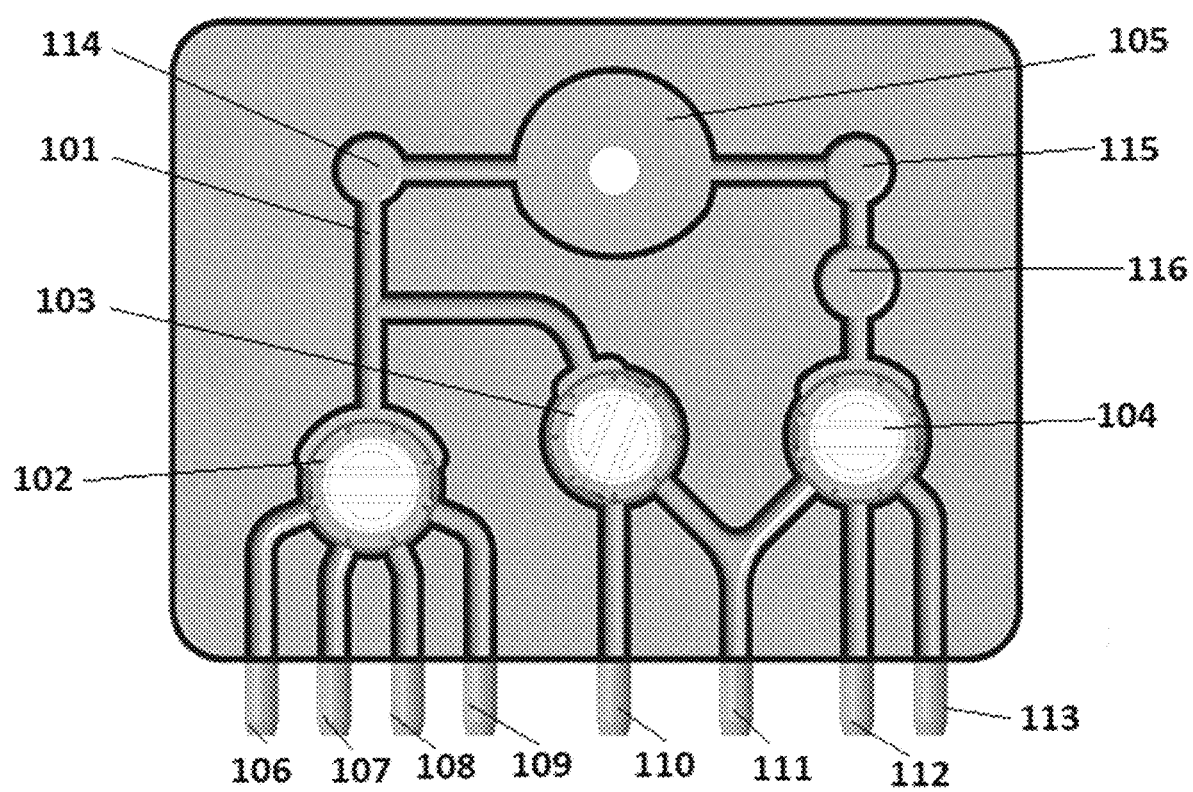
FIGS. 1A-D illustrate a peritoneal dialysis cassette for use with a peritoneal dialysis system.

Unless defined otherwise, all technical and scientific terms used have the same meaning as commonly understood by one of ordinary skill in the art.

The articles "a" and "an" are used to refer to one to over one (i.e., to at least one) of the grammatical object of the article. For example, "an element" means one element or over one element.

An "adhesive" refers to a substance or composition that forms a bond with one or more materials or surfaces, the bond resisting separation.

A "catheter" is a flexible tube that can be inserted into a patient for adding or removing fluid.

The term "communication" refers to the ability to pass data between two or more components or systems by any means.

The term "comprising" includes, but is not limited to, whatever follows the word "comprising." Use of the term indicates the listed elements are required or mandatory but that other elements are optional and may be present.

The term "connected" or to "connect" refers to physical contact between two or more components.

The term "consisting of" includes and is limited to whatever follows the phrase "consisting of." The phrase indicates the limited elements are required or mandatory and that no other elements may be present.

The term "consisting essentially of" includes whatever follows the term "consisting essentially of" and additional elements, structures, acts, or features that do not affect the basic operation of the apparatus, structure or method described.

A "control system" can be a combination of components that act together to maintain a system to a desired set of performance specifications. The control system can use processors, memory and computer components configured to interoperate to maintain the desired performance specifications. The control system can receive data from sensors to determine a state of a system and control one or more components to maintain a desired performance specification. The control system can also include fluid or gas control components, and solute control components as known within the art to maintain performance specifications.

A "drain line" is a fluid line through which used or waste fluid can be disposed.

The terms "enclosing" or to "enclose" refer to a housing surrounding a component or portion of a system.

The term "engageable" or to "engage" refers to two or more components in contact with each other.

The terms "extending" or to "extend" refer to a component reaching or positioned through another component or position.

A "flow path" is a passageway through which a fluid can move.

The term "fluidly connectable" refers to the ability of providing for the passage of fluid, gas, or combination thereof, from one point to another point. The ability of providing such passage can be any connection, fastening, or forming between two points to permit the flow of fluid, gas, or combinations thereof. The two points can be within or between any one or more of compartments of any type, modules, systems, components, and rechargers.

The term "fluidly connected" refers to a particular state such that the passage of fluid, gas, or combination thereof, is provided from one point to another point. The connection state can also include an unconnected state, such that the two points are disconnected from each other to discontinue flow. It will be further understood that the two "fluidly connectable" points, as defined above, can from a "fluidly connected" state. The two points can be within or between any one or more of compartments, modules, systems, components, and rechargers, all of any type.

The term "hot plate welding" refers to a process whereby one or more heated plates are used to melt joining surfaces of two components.

An "inlet/outlet port" is an opening or conduit through which fluids can enter or exit a component.

The term "insertable" or to "insert" refer to moving a first component into an interior portion of a second component.

The term "laser welding" refers to a process whereby a laser beam is used to provide a concentrated heat source to join two components.

A "membrane" is a flexible material covering a portion of a surface of a component.

A "motor" is an electrical device that imparts movement on one or more components.

An "opening" is a hole extending through a portion of a surface of a component.

A "patient" or "subject" is a member of any animal species, preferably a mammalian species, optionally a human. The subject can be an apparently healthy individual, an individual suffering from a disease, or an individual being treated for a disease.

A "patient line" refers to a fluid line fluidly connectable to a catheter for infusion of fluid into a patient or removal of fluid from a patient.

A "peritoneal dialysis cycler" or "cycler" is a component or set of components for movement of fluid into and out of the peritoneal cavity of a patient.

"Peritoneal dialysis fluid" is a dialysis solution to be used in peritoneal dialysis having specified parameters for purity and sterility. Peritoneal dialysis fluid is not the same as dialysate fluid of the type used in hemodialysis.

A "peritoneal dialysis fluid source" is a container of any type that holds components used to generate peritoneal dialysis fluid.

A "peritoneal dialysis fluid bag" is a container of any type that holds peritoneal dialysis fluid prior to infusion of the peritoneal dialysis fluid into a patient.

"Peritoneal dialysis" is a therapy wherein a peritoneal dialysis fluid is infused into the peritoneal cavity, which serves as a natural dialyzer. In general, waste components diffuse from a patient's bloodstream across a peritoneal membrane into the dialysis solution via a concentration gradient. In general, excess fluid in the form of plasma water flows from a patient's bloodstream across a peritoneal membrane into the dialysis solution via an osmotic gradient. Once the infused peritoneal dialysis solution has captured sufficient amounts of the waste components the fluid is removed. This cycle can be repeated for several cycles each day or as needed.

A "pressure sensor" is a component or set of components capable of determining a force exerted by a fluid in a system.

The term "programmed," when referring to a processor, can mean a series of instructions that cause a processor to perform certain steps.

The term "pump" refers to any device that causes the movement of fluids or gases by applying suction or pressure.

The term "rigid housing" refers to the outer surfaces of a component that are substantially inflexible.

The term "rigid surface" refers to the outer portion of a component that is substantially inflexible.

A "rotary valve" is a component that can block or allow fluid movement through specified flow paths by through rotating or turning the valve.

The term "selectively directing" or to "selectively direct" refer to causing fluid to move through a system in a specified pathway.

A "servo motor" is an electrical motor that can rotate around an axis.

A "stepper motor" is a brushless direct current electric motor that divides a full rotation into a number of discrete steps.

The term "surface" refers to the outer portion of a component.

The term "ultrasonic welding" refers to a process whereby high-frequency ultrasonic acoustic vibrations are applied to components being held together under pressure to create a solid-state weld.

The term "welding" refers to two components connected together by application of heat.

Peritoneal Dialysis Cassette

Figure 1B:
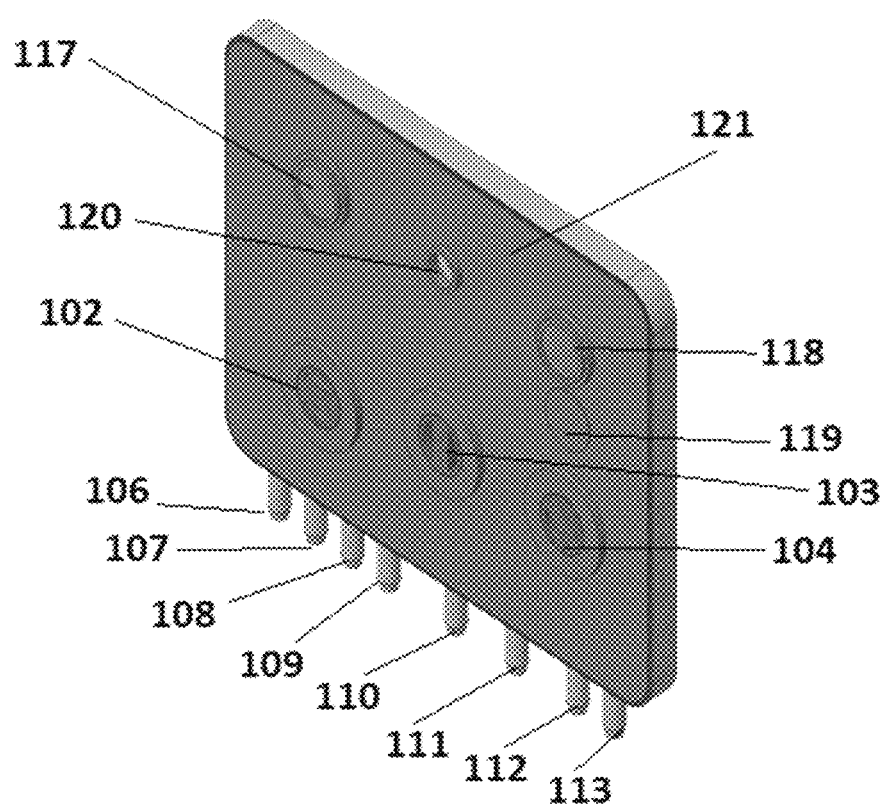
Figure 1C:
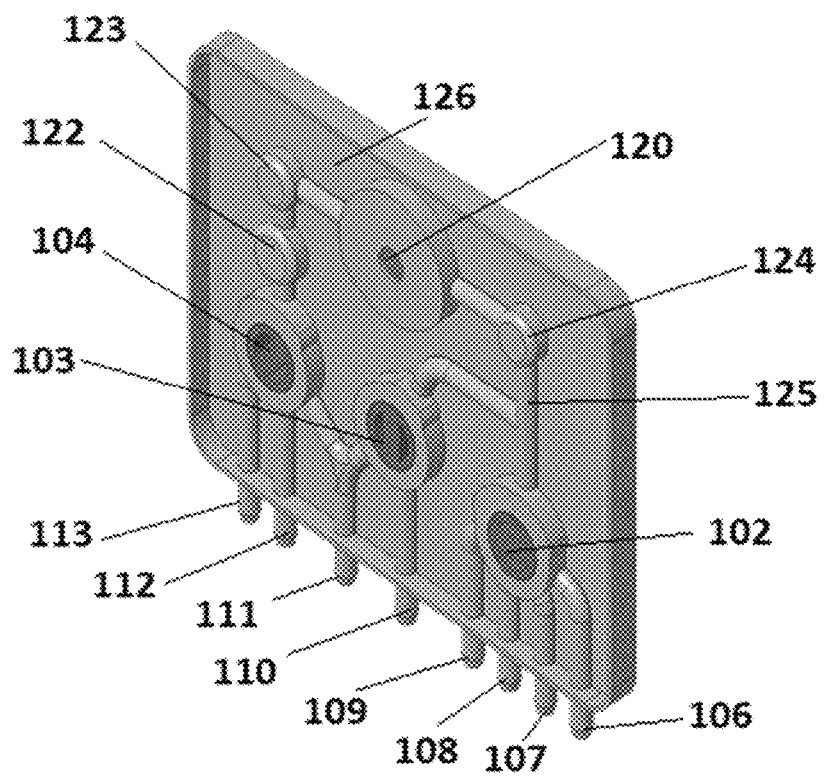
Figure 1D:
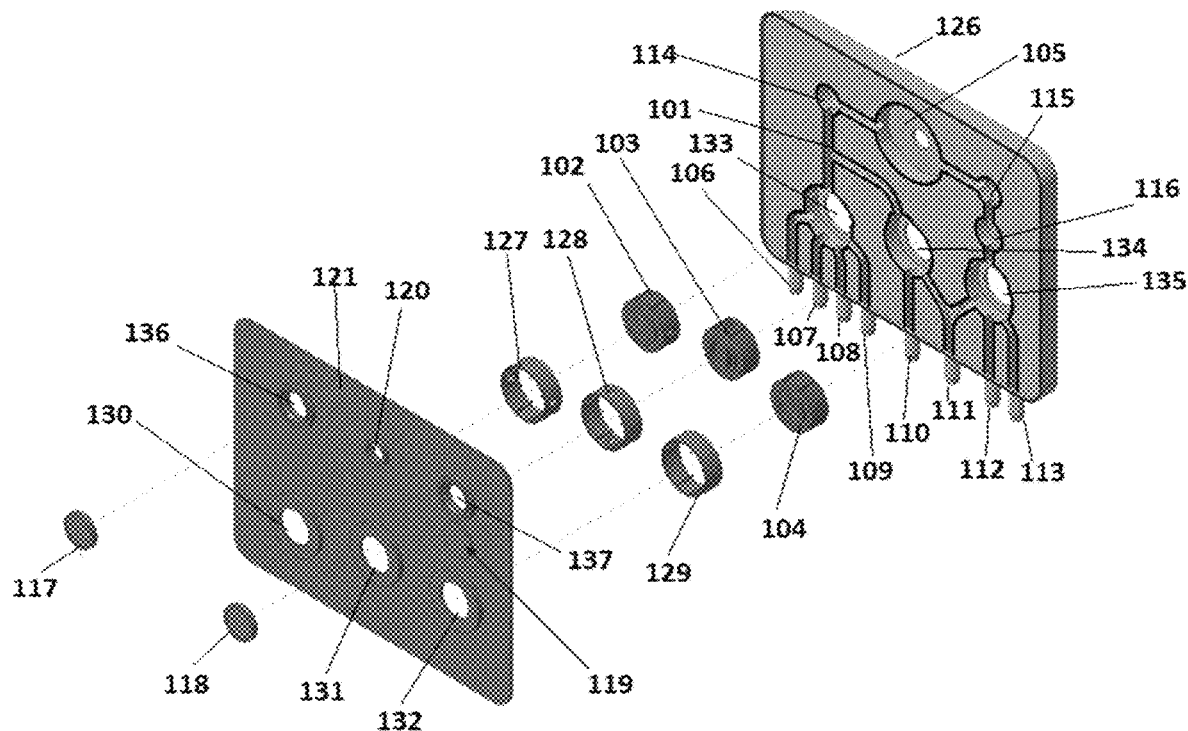

FIGS. 1A-D illustrate a peritoneal dialysis cassette. FIG. 1A is a cross-section view of the peritoneal dialysis cassette, FIG. 1B is a front perspective view of the peritoneal dialysis cassette, FIG. 1C is a back perspective view of the peritoneal dialysis cassette, and FIG. 1D is an exploded view of the peritoneal dialysis cassette.

As illustrated in FIG. 1A, the peritoneal dialysis cassette encloses one or more fluid flow paths 101. The fluid flow paths connect various input/output ports. For example, in FIGS. 1A-D, the fluid flow paths 101 for fluid connections between inlet/outlet port 106, inlet/outlet port 107, inlet/outlet port 108, inlet/outlet port 109, inlet/outlet port 110, inlet/outlet port 111, inlet/outlet port 112, and inlet/outlet port 113. The inlet/outlet ports can be connected to various components of a peritoneal dialysis system, allowing control over the movement of fluid between the various components for generation of peritoneal dialysis fluid, infusion of the peritoneal dialysis fluid into a patient, drainage of used fluid from the patient, and/or cleaning and disinfection of the system.

The movement of fluid through the fluid flow paths 101 of the peritoneal dialysis cassette can be controlled by rotary valves. As illustrated in FIG. 1A, rotary valve 102 can control fluid movement to or from inlet/outlet port 106, inlet/outlet port 107, inlet/outlet port 108, or inlet/outlet port 109. Rotary valve 103 can control the movement of fluid to or from inlet/outlet port 110 and inlet/outlet port 111. Rotary valve 104 can control the movement of fluid to or from inlet/outlet port 111, inlet/outlet port 112, and inlet/outlet port 113. As described in detail herein, the rotary valves can be operated by servo motors in communication with a control system (not shown). Each rotary valve includes two openings on opposite sides, allowing fluid movement between specified flow paths. Although illustrated with eight inlet/outlet ports, one of skill in the art will understand that the peritoneal dialysis cassette can include any number of inlet/outlet ports depending on the number of components connected to the peritoneal dialysis cassette. Similarly, any number of rotary valves can be included to direct fluid from any inlet/outlet port to any other inlet/outlet port. In certain embodiments, a pump (not shown) can be included to drive fluid through the fluid flow paths 101 and the peritoneal dialysis system. A pump connected to a stepper motor can be included in the peritoneal dialysis cassette in position 105, allowing the pump to drive fluid movement to and from any of the rotary valves.

In certain embodiments, the peritoneal dialysis cassette can include one or more sensors. For example, a pressure sensor can be included at position 114 and/or position 115 to measure the fluid pressure inside the peritoneal dialysis cassette. A temperature sensor can be included that can measure the temperature of the fluid through a window over position 116. One of skill in the art will understand that other types of sensors can also be included, such as refractive index sensors, flow sensors, and/or conductivity sensors.

As illustrated in FIG. 1B, the front of the peritoneal dialysis cassette is a first rigid surface 121. Rotary valve 102, rotary valve 103, and rotary valve 104 extend to the outer edge of the first rigid surface 121. In certain embodiments, servo motors can engage with rotary valve 102, rotary valve 103, and rotary valve 104 from a peritoneal dialysis system to control the direction of each valve, thus controlling fluid movement through the fluid flow paths in the peritoneal dialysis cassette. Inlet/outlet port 106, inlet/outlet port 107, inlet/outlet port 108, inlet/outlet port 109, inlet/outlet port 110, inlet/outlet port 111, inlet/outlet port 112, and inlet/outlet port 113 extend through the peritoneal dialysis cassette for connection to components of the dialysis system. A stepper motor (not shown) can control a pump through opening 120. A first membrane 117 and second membrane 118 cover the pressure sensor regions illustrated in FIG. 1A. The pressure exerted on the first membrane 117 and second membrane 118 can be measured to determine a fluid pressure in the fluid flow paths. Window 119 can be included to allow a temperature sensor (not shown) to measure a fluid temperature inside the peritoneal dialysis cassette.

As illustrated in FIG. 1C, the back of the peritoneal dialysis cassette can be a second rigid surface 126. Because the front surface 121 and the back surface 126 are both rigid surfaces rather than a membrane surface, the peritoneal dialysis cassette can be connected to the dialysis system without the need for complex pneumatic systems. In certain embodiments, the fluid flow paths inside the peritoneal dialysis cassette can be wider than the cassette, with ridges 125 extending from the second rigid surface 126. Alternatively, a wider peritoneal dialysis cassette can be used and the second rigid surface 126 can be substantially flat. As described, servo motors can engage with rotary valve 102, rotary valve 103, and rotary valve 104 from a peritoneal dialysis system to control the direction of each valve. The servo motors can engage with the rotary valves through either the first rigid surface 121 or second rigid surface 126. Similarly, the stepper motor (not shown) can control the pump through opening 120 from the back rigid surface 126. Fluid pressure in the fluid flow paths can be sensed at pressure sensing region 123 and pressure sensing region 124. Temperature sensing region 122 can be included extending beyond the back rigid surface 126.

As illustrated in FIG. 1D, the first rigid surface 121 can connect to the second rigid surface 126, forming a rigid housing with fluid flow paths 101 between the two surfaces. The first rigid surface 121 and second rigid surface 126 can be connected by any means known in the art, including by welding. In any embodiment, any one or combination of ultrasonic welding, hot plate welding, laser welding can be used to affix the first rigid surface 121 to the second rigid surface 126. One of ordinary skill will understand suitable configurations, materials, and process to implement the welding of first rigid surface 121 to the second rigid surface 126 using any of the described approaches. Alternatively, and suitable adhesive can also be used to affix the first rigid surface 121 to the second rigid surface 126. Pressure sensor membrane 117 and pressure sensor membrane 118 align with opening 136 and 137 over position 114 and position 115, respectively. Rotary valve 102, rotary valve 103, and rotary valve 104 are aligned with opening 130, opening 131, and opening 132, respectively, to allow connection to servo motors through the openings. Similarly, the rotary valves align with opening 133, opening 134, and opening 135 on the back rigid surface 126. Although illustrated with openings on both the front rigid surface 121 and back rigid surface 126, the rotary valves can be operated with openings through a single surface. Rotary valve 102 includes flow director seal 127. The flow director seal 127 prevents fluid from leaking through the rotary valve 102 other than into the portion of the fluid flow path 101 intended. Similarly, rotary valve 103 includes flow director seal 128 and rotary valve 104 includes flow director seal 129. Inlet/outlet port 106, inlet/outlet port 107, inlet/outlet port 108, inlet/outlet port 109, inlet/outlet port 110, inlet/outlet port 111, inlet/outlet port 112, and inlet/outlet port 113 are illustrated as being part of the back rigid surface 126. However, the inlet/outlet ports can alternatively be included as part of the front rigid surface 121.

Figure 2A:
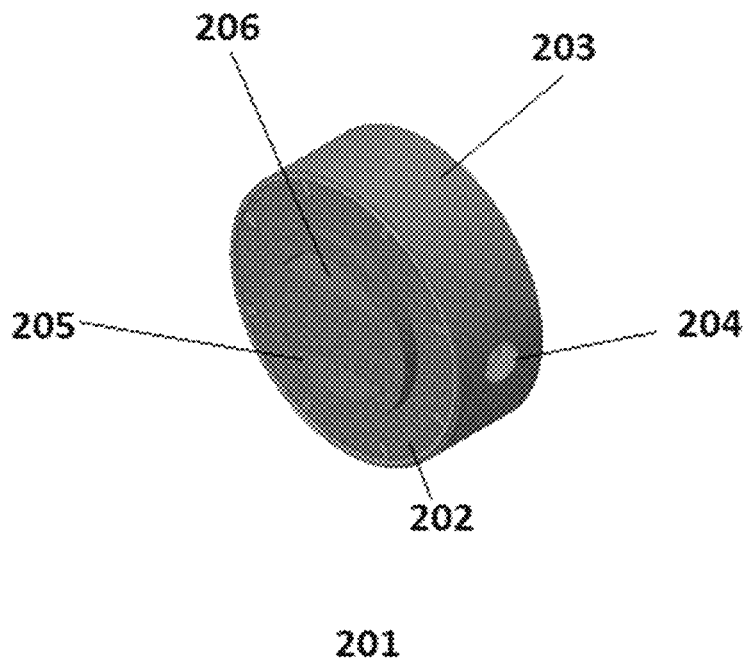
FIGS. 2A-C illustrate a rotary valve for use with the peritoneal dialysis cassette.
Figure 2B:
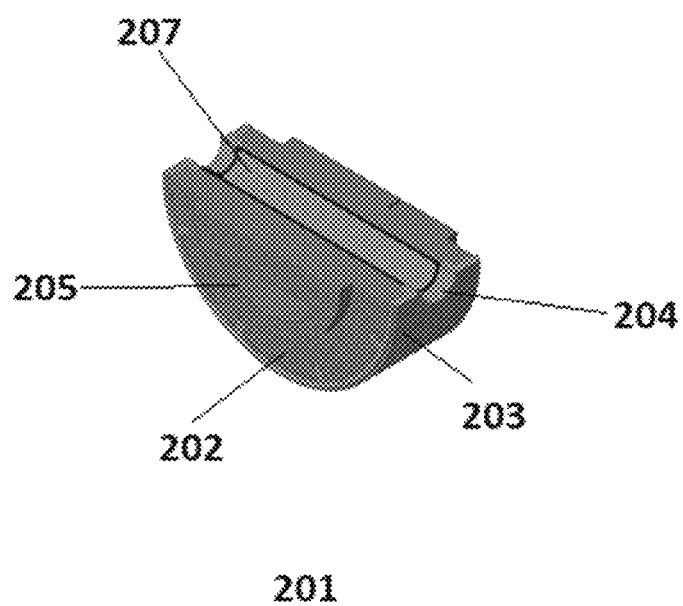
Figure 2C:
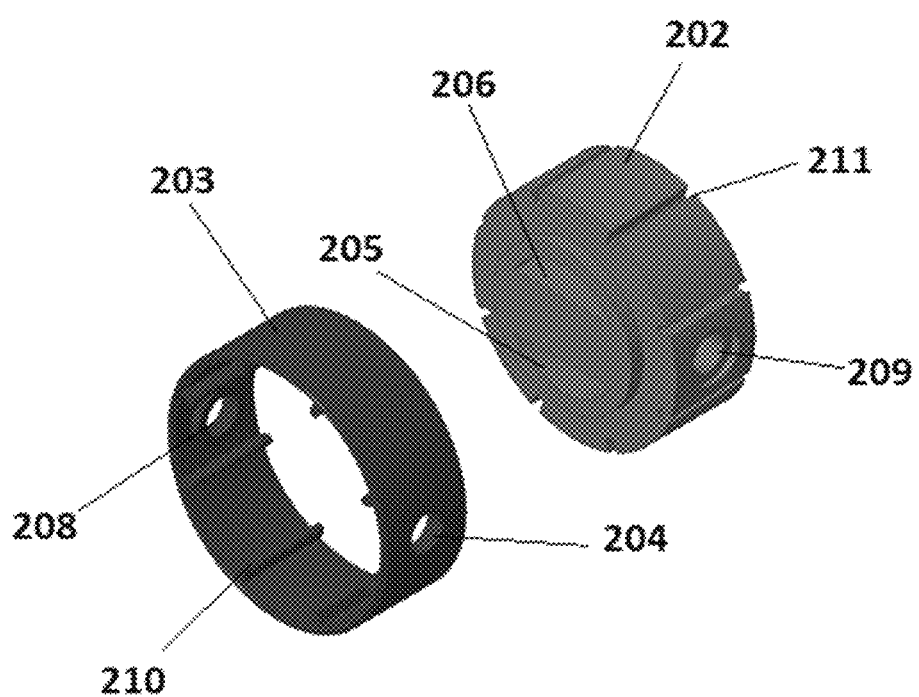

FIGS. 2A-C illustrate details of a rotary valve 201 that can be used in the peritoneal dialysis cassette. FIG. 2A is a perspective view of the rotary valve 201, FIG. 2B is a cross sectional view of the rotary valve 201 and FIG. 2C is an exploded view of the rotary valve 201.

As illustrated in FIG. 2A, the rotary valve 201 includes a valve portion 202 and a flow director seal 203. The flow director seal 203 prevents fluid from leaking from the valve portion 202 into unintended flow paths. Fluid can only travel through the rotary valve 201 between a first flow opening 204 in the flow director seal 203 to a second flow opening (not shown) in the flow director seal 203. As the first flow opening 204 and second flow opening are only open to specified flow paths, flow of fluid is controlled in a specified pathway. Servo motors can engage with opening 205 and opening 206 to turn the rotary valve 201. The servo motors can communicate with a control system (not shown) to selectively direct fluid in a specified flow path.

As illustrated in FIG. 2B, the valve portion 202 of the rotary valve 201 includes a flow path 207 from the first flow opening 204 and a second flow opening (not shown) in the flow director seal 203. When the flow path 207, the first flow opening 204, and the second flow opening are aligned in the peritoneal dialysis cassette with flow paths inside the cassette housing, fluid can pass through the rotary valve 201.

As illustrated in FIG. 2C, the flow director seal 203 can fit over the valve portion 202 of the rotary valve 201. In certain embodiments, ridges 210 on the flow director seal 203 can engage with indentations 211 on the valve portion 202 to ensure that the flow director seal 203 remains properly aligned with the flow path through the valve portion 202. However, alternative methods of engaging the flow director seal 203 and the valve portion 202 can be used, including heat welding, glue, or any other means of connecting the flow director seal 203 and the valve portion 202. The first opening 204 on the flow director seal 203 is aligned with a corresponding opening 209 on the valve portion. Similarly, a second opening 208 on the flow director seal 203 is aligned with a corresponding opening (not shown) on the valve portion 202.

Figure 3A:
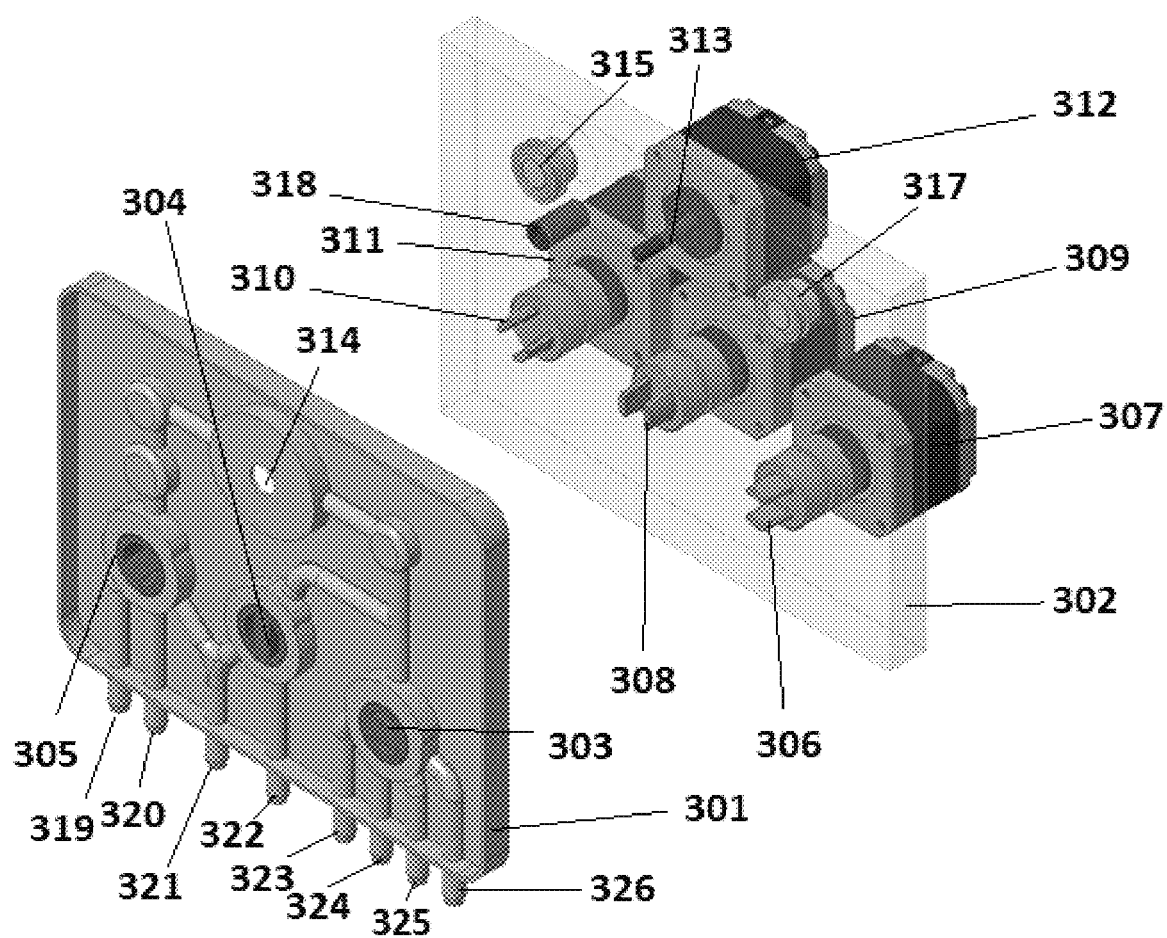
FIGS. 3A-C illustrate the interface between a peritoneal dialysis system and the peritoneal dialysis cassette.
Figure 3B:
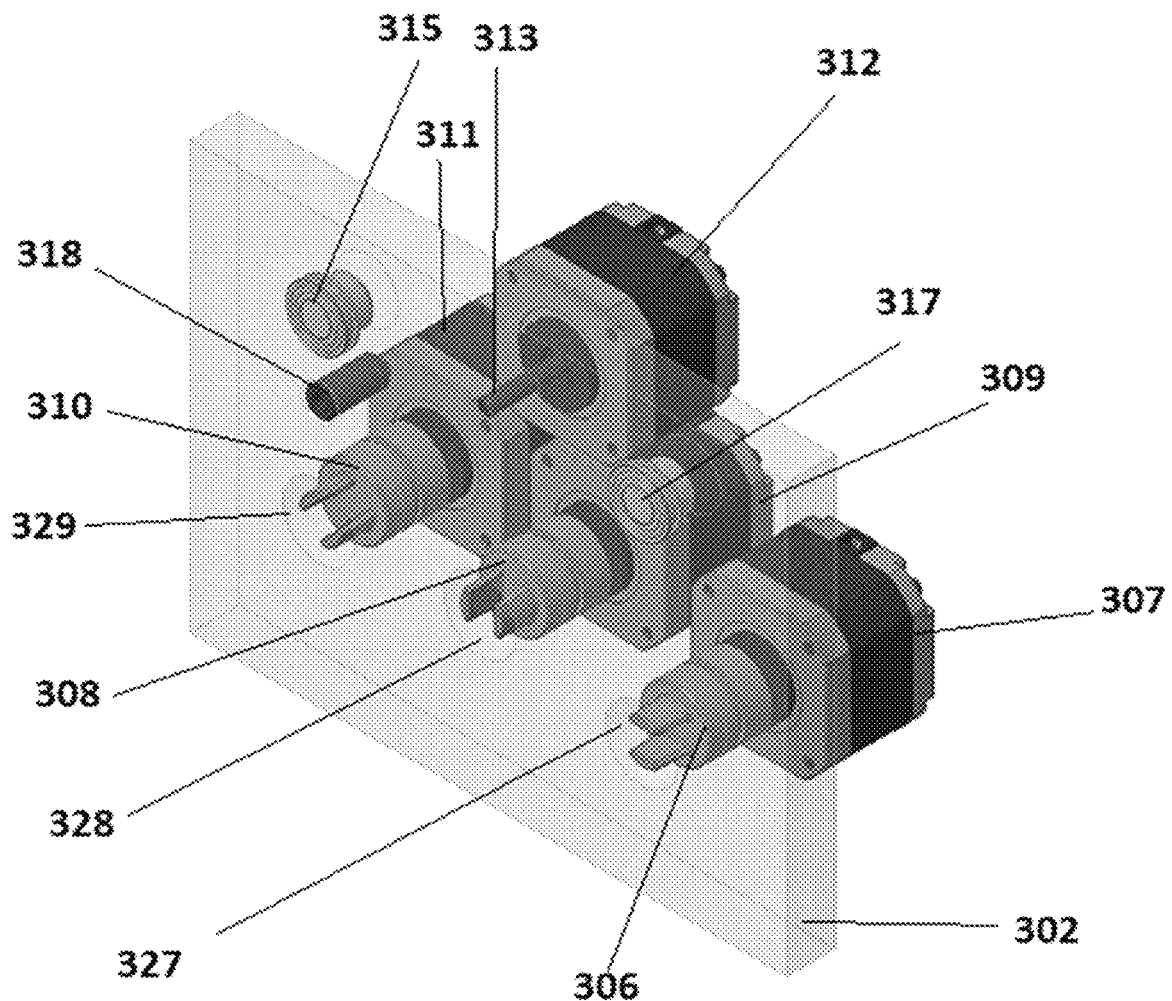
Figure 3C:
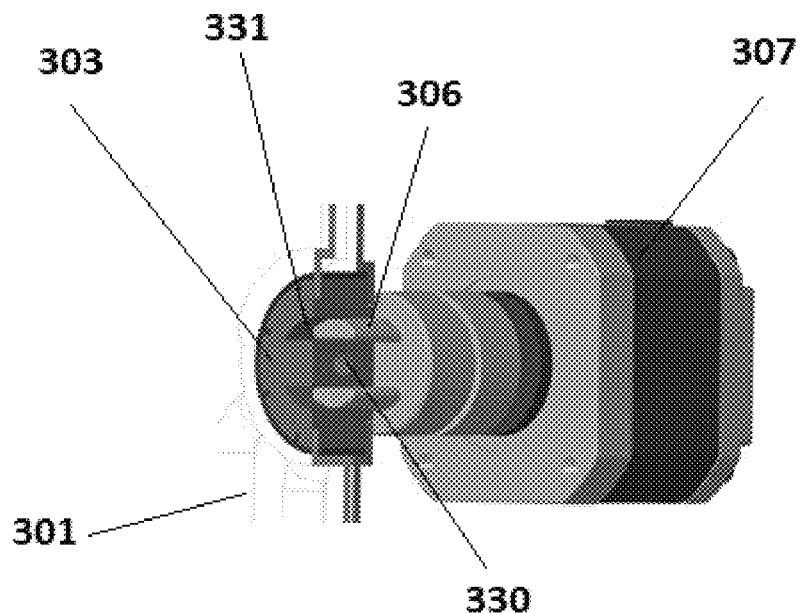

FIGS. 3A-C illustrate the peritoneal dialysis cassette being installed onto a cycler of a peritoneal dialysis system. FIG. 3A illustrates the system prior to installation, FIG. 3B illustrates the system during installation, and FIG. 3C is a cross-sectional view of a rotary valve 303 after installation.

Prior to installation, the peritoneal dialysis cassette 301 can be aligned with a receiving compartment 302 of a peritoneal dialysis system. In certain embodiments, the receiving compartment 302 can be part of a peritoneal dialysis cycler. However, the receiving compartment 302 can be included in any portion of the peritoneal dialysis system. Prongs 310 connected to servo motor 311 can be aligned with openings in rotary valve 305. Similarly, prongs 308 connected to servo motor 309 and prongs 306 connected to servo motor 307 can be aligned with rotary valve 304 and rotary valve 303, respectively. Drive 313 connected to stepper motor 312 can be aligned with opening 314 on the peritoneal dialysis cassette 301. Drive 313 can drive a pump (not shown) to move fluid through the peritoneal dialysis cassette 301. Pressure sensor 315 and pressure sensor 317 can be aligned with membranes (not shown) covering pressure sensor regions of the peritoneal dialysis cassette 301 to measure the fluid pressure in the fluid flow paths of the peritoneal dialysis cassette 301. Similarly, temperature sensor 318 can be aligned with a window (not shown) over a temperature sensing region of the peritoneal dialysis cassette 301. Once installed, fluid lines can be connected to inlet/outlet port 319, inlet/outlet port 320, inlet/outlet port 321, inlet/outlet port 322, inlet/outlet port 323, inlet/outlet port 324, inlet/outlet port 325, and inlet/outlet port 326. As described, the peritoneal dialysis cassette 301 can include any number of inlet/outlet ports, and is not limited to the embodiment illustrated in FIGS. 3A-C.

As illustrated in FIG. 3B, for installation of the peritoneal dialysis cassette 301, a drive retracts into the peritoneal dialysis cycler, or any other portion of the peritoneal dialysis system. Prongs 310 connected to servo motor 311 have retracted through opening 329 in the receiving compartment 302. Similarly, prongs 308 connected to servo motor 309 and prongs 306 connected to servo motor 307 are retracted through openings 328 and 327, respectively. The receiving compartment 302 is now in condition for installation of the peritoneal dialysis cassette (not shown in FIG. 3B). The prongs 310 of servo motor 311 prongs 308 of servo motor 309, and prongs 306 of servo motor 307 are insertable into openings in each rotary valve. Similarly, drive 313 of stepper motor 312 is insertable through an opening in the peritoneal dialysis cassette.

FIG. 3C is a cross section of the interface between the peritoneal dialysis cassette 301 and receiving compartment 302 after installation. Once the peritoneal dialysis cassette 301 has been installed in the receiving compartment 302, prongs 306 connected to servo motor 307 have been inserted through openings 331 of rotary valve 303. The prongs connected to the other servo motors are likewise inserted into openings in each rotary valve. When the servo motor 307 is activated, the prongs 306 turn, rotating the valve to a specified position as controlled by a control system (not shown). Fluid flow path 330 through rotary valve 303 forms a fluid flow path with passageways through the peritoneal dialysis cassette 301 on either side of the rotary valve 303. When fluid flow path 330 is aligned with passageways on each side of rotary valve 303, a fluid flow path is formed. If fluid flow path 330 is not aligned on each side of rotary valve 303, fluid cannot pass through the rotary valve 303, preventing formation of a specific flow path.

Once installed, the peritoneal dialysis cassette 301 can be held in place using any type of holding mechanism. For example, the holding mechanism can be a simple mechanical fixture, such as a fixture can be with snaps to hold the peritoneal dialysis cassette 301. Alternative methods for holding the peritoneal dialysis cassette 301 in place after installation can be used, such as latches or compression springs.

Figure 4A:
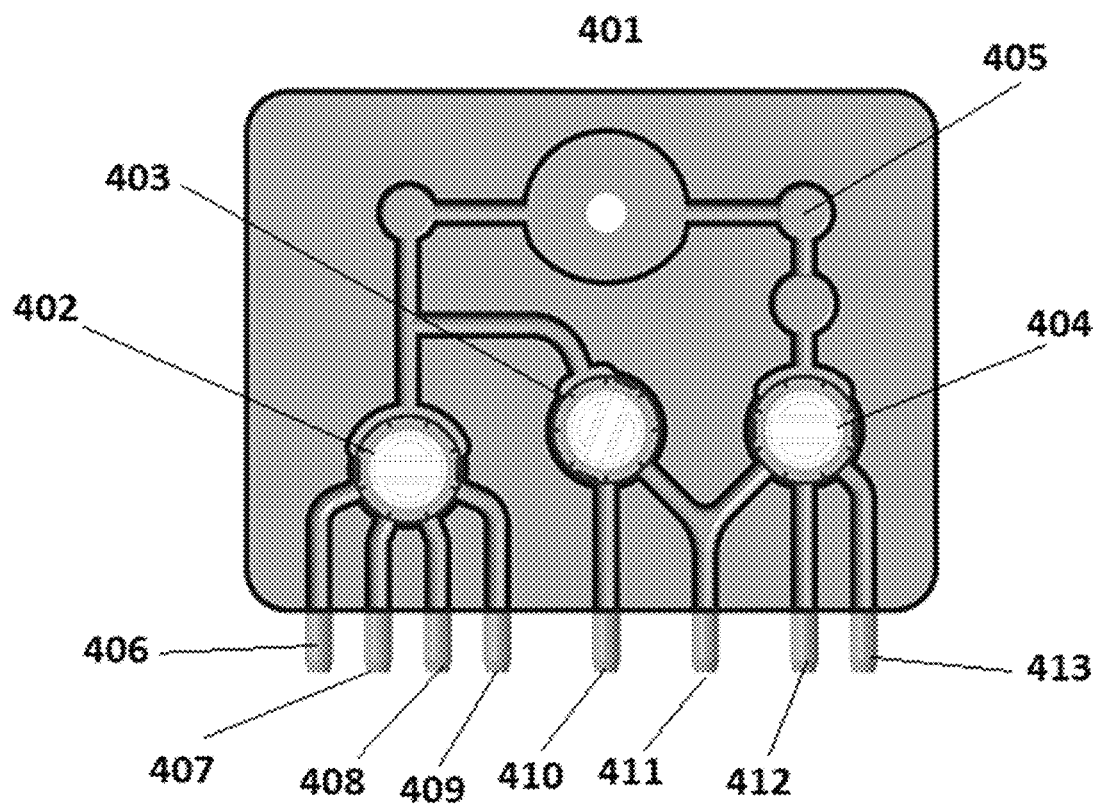
FIGS. 4A-H illustrate configurations to perform various functions of a peritoneal dialysis system.
Figure 4B:
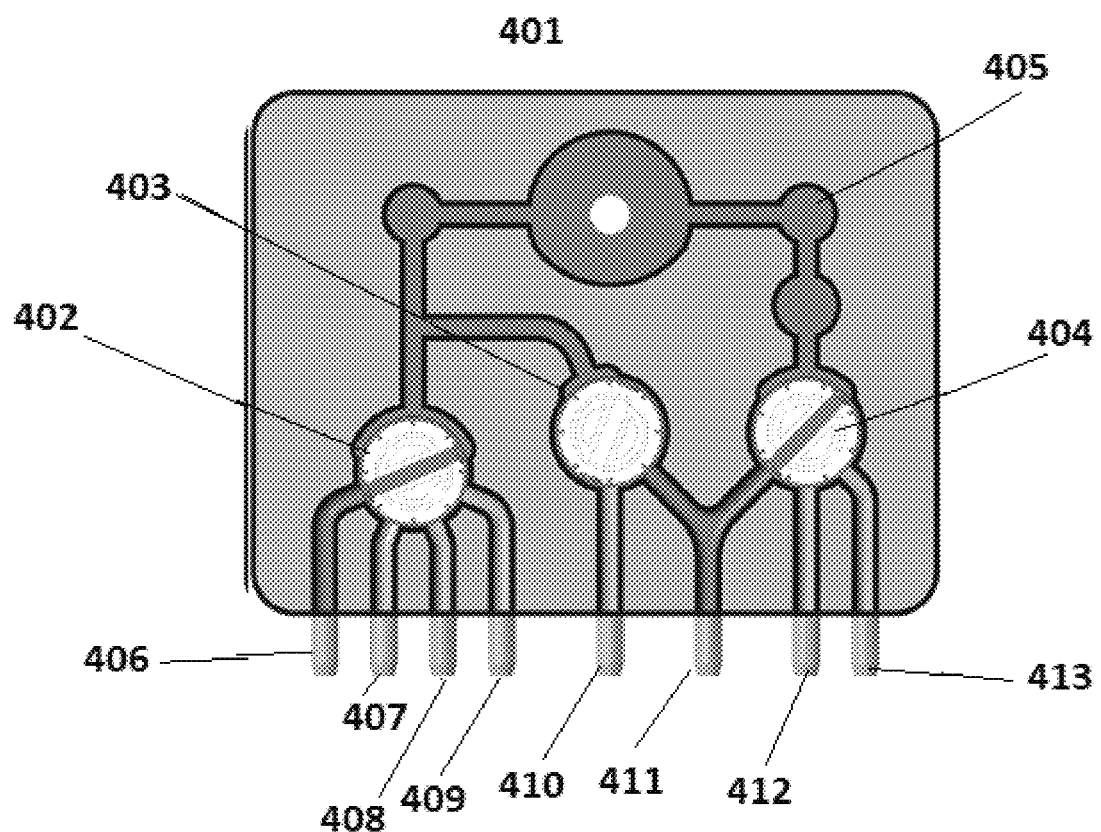
Figure 4C:
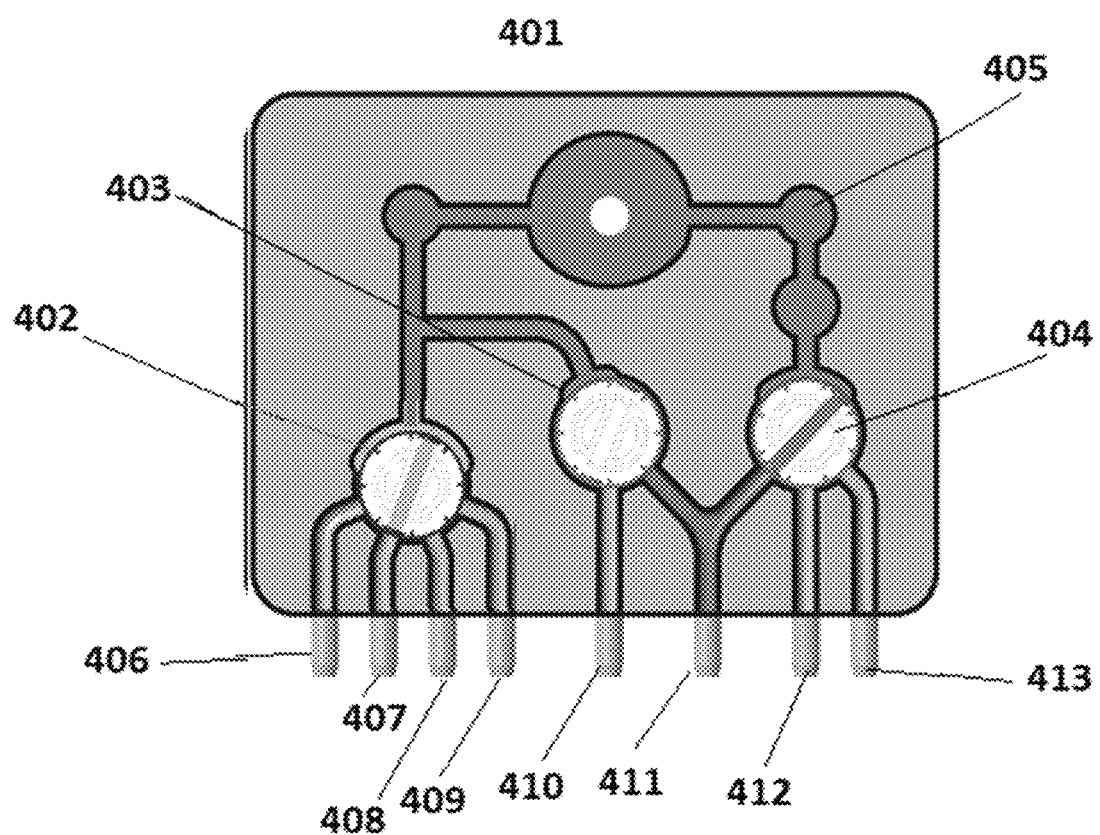
Figure 4D:
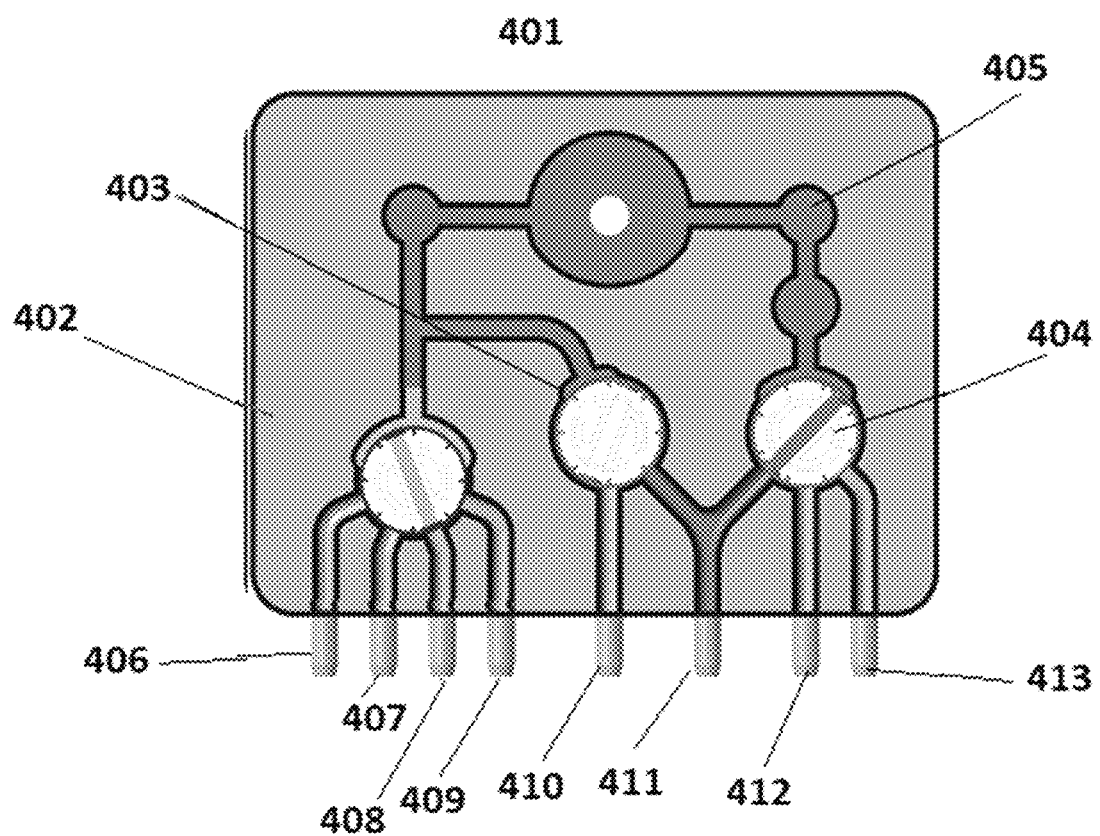
Figure 4E:
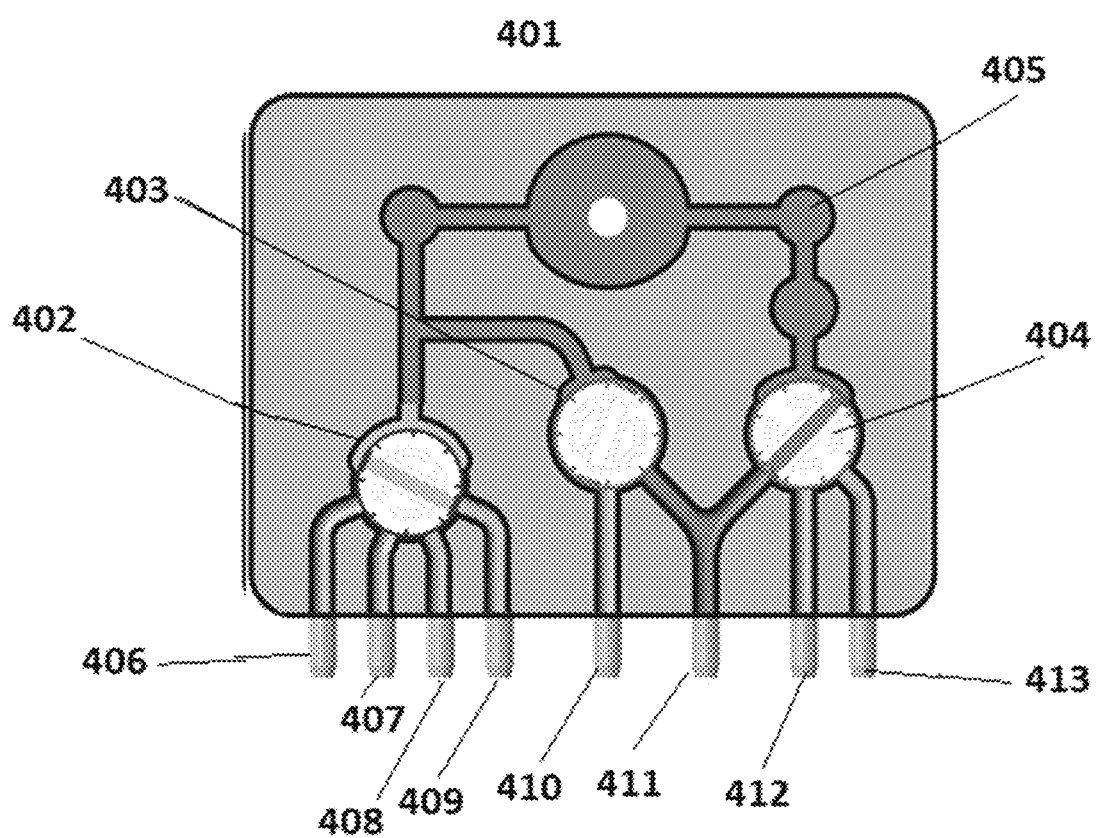
Figure 4F:
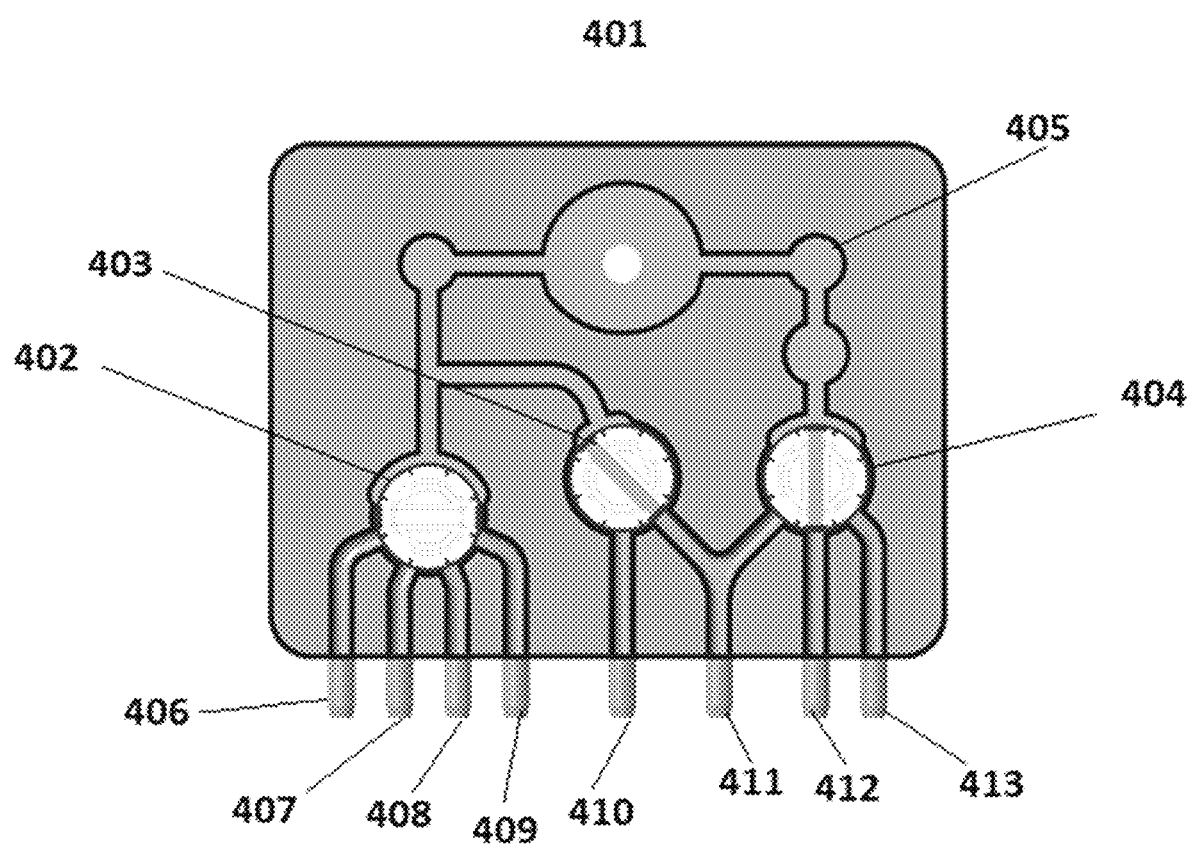
Figure 4G:
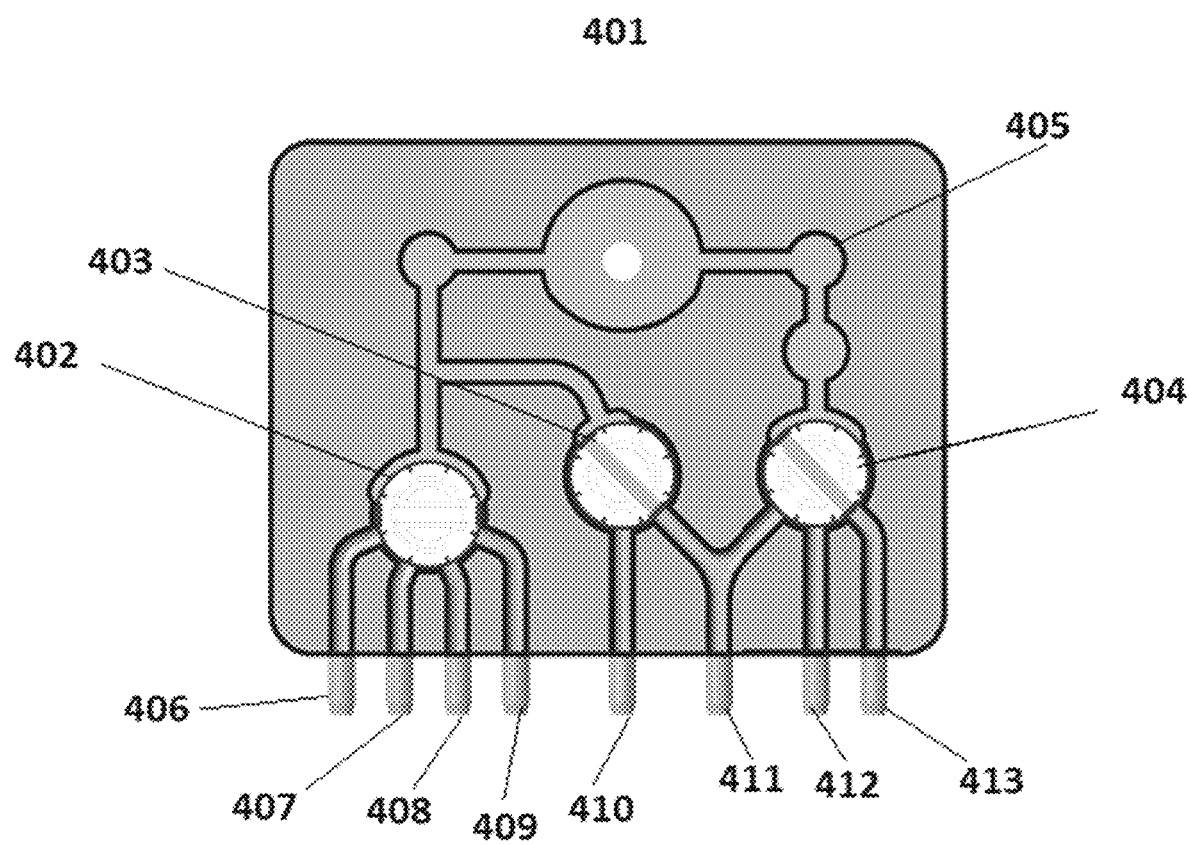
Figure 4H:
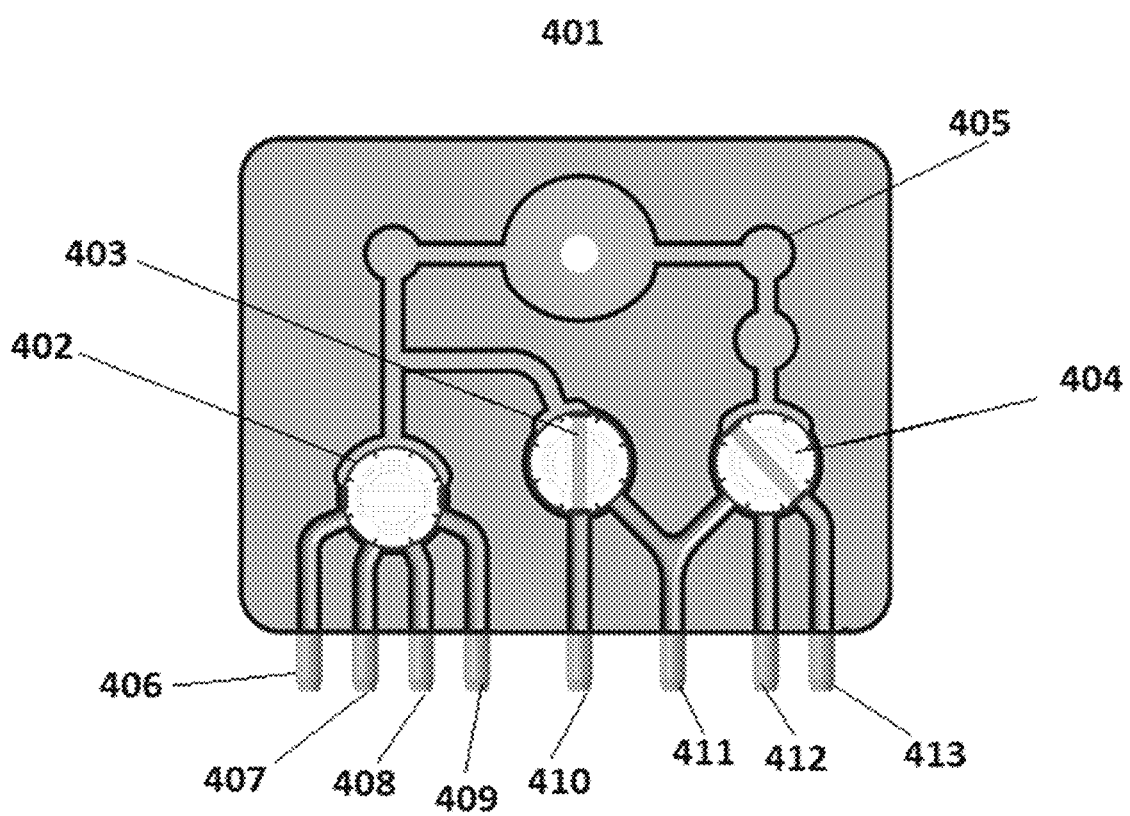

FIGS. 4A-H illustrate non-limiting examples of fluid movement through a peritoneal dialysis cassette 401. FIG. 4A is the initial state of the peritoneal dialysis cassette 401, FIG. 4B illustrates movement of fluid from a first pre-filled bag to a peritoneal dialysis fluid bag, FIG. 4C illustrates movement of fluid from a second pre-filled bag to a peritoneal dialysis fluid bag; FIG. 4D illustrates movement of fluid from a third pre-filled bag to a peritoneal dialysis fluid bag; FIG. 4E illustrates movement of fluid from a fourth pre-filled bag to a peritoneal dialysis fluid bag; FIG. 4F illustrates fluid movement from a peritoneal dialysis fluid bag to a drain line; FIG. 4G illustrates fluid movement from a peritoneal dialysis fluid bag into a patient line, and FIG. 4H illustrates fluid movement from a patient line to a drain line.

In each of FIGS. 4A-H, inlet/outlet port 406 is fluidly connectable to the first pre-filled bag; inlet/outlet port 407 is fluidly connectable to a second pre-filled bag; inlet/outlet port 408 is fluidly connectable to a third pre-filled bag; inlet/outlet port 409 is fluidly connectable to a fourth pre-filled bag; inlet/outlet port 410 and inlet/outlet port 412 are fluidly connectable to a drain line, inlet/outlet port 411 is fluidly connectable to a peritoneal dialysis fluid bag; and inlet/outlet port 413 is fluidly connectable to a patient line. However, one of skill in the art will understand that the components each inlet/outlet port are connected to are provided for illustrative purposes only. Additional or fewer components can be connected through the peritoneal dialysis cassette 401 and the location of each inlet/outlet port connected to each component can be changed.

In FIGS. 4A-H, the system uses four pre-filled bags as a peritoneal dialysis fluid source containing concentrated solutions of various peritoneal dialysis components. Solutions from each of the pre-filled bags are added to the peritoneal dialysis fluid bag for mixing and heating and then infused into the patient. However, the described peritoneal dialysis cassette can work with additional or fewer pre-filled bags, or can work with a single peritoneal dialysis fluid bag already having all of the components of the final peritoneal dialysis fluid.

FIG. 4A shows the peritoneal dialysis cassette 401 at the initial state. Rotary valve 402, rotary valve 403, and rotary valve 404 are each turned to block fluid between any inlet/outlet port and the internal fluid flow paths 405 of the peritoneal dialysis cassette 401. In this initial state, no fluid can move into, through, or out of the peritoneal dialysis cassette 401.

To begin generating peritoneal dialysis fluid for treatment, fluid can be added to the peritoneal dialysis fluid bag from each of the pre-filled bags. In FIG. 4B, the bold colored portions of fluid flow path 405 show where fluid is moving through the peritoneal dialysis cassette 401. Rotary valve 402 has been turned to form a flow path between inlet/outlet port 406 and internal fluid flow path 405. Likewise, rotary valve 404 has been turned to form a flow path between internal fluid flow path 405 and inlet/outlet port 411, which leads to the peritoneal dialysis fluid bag. Rotary valve 403 remains closed to all flow paths, preventing fluid movement. However, as described, other valve arrangements can be used to selectively direct fluid from inlet/outlet port 406 to inlet/outlet port 411. A pump (not shown) can pump fluid from the first pre-filled bag, through the peritoneal dialysis cassette 401 into the peritoneal dialysis fluid bag.

As illustrated in FIG. 4C, once a predetermined volume of fluid has been moved from the first pre-filled bag to the peritoneal dialysis fluid bag, rotary valve 402 can be turned close the flow path between internal fluid flow path 405 and inlet/outlet port 406 and to form a flow path between internal fluid flow path 405 and inlet/outlet port 407. Rotary valve 403 and rotary valve 404 remain unchanged. Fluid can now be pumped from the second pre-filled bag, through inlet/outlet port 407 and the internal fluid flow paths 405 of the peritoneal dialysis cassette 401 to the peritoneal dialysis fluid bag via inlet/outlet port 411.

In FIG. 4D, rotary valve 402 has been further turned to form a flow path between internal fluid flow path 405 and inlet/outlet port 408, connected to the third pre-filled bag. Similar to that shown in FIGS. 4B-C, fluid can now be pumped from the third pre-filled bag, through inlet/outlet port 408 and the internal fluid flow paths 405 of the peritoneal dialysis cassette 401 to the peritoneal dialysis fluid bag via inlet/outlet port 411.

In FIG. 4E, rotary valve 402 has been further turned to form a flow path between internal fluid flow path 405 and inlet/outlet port 409, connected to the fourth pre-filled bag. Similar to that shown in FIGS. 4B-D, fluid can now be pumped from the fourth pre-filled bag, through inlet/outlet port 409 and the internal fluid flow paths 405 of the peritoneal dialysis cassette 401 to the peritoneal dialysis fluid bag via inlet/outlet port 411.

FIG. 4F shows a configuration for pumping fluid from the peritoneal dialysis fluid bag to the drain line. Rotary valve 402 has been turned to block any flow paths from the pre-filled bags through inlet/outlet port 406, inlet/outlet port 407, inlet/outlet port 408, or inlet/outlet port 409 into the internal fluid flow paths 405 of the peritoneal dialysis cassette 401. Rotary valve 403 has been turned to form a fluid flow path from inlet/outlet port 411, connected to the peritoneal dialysis fluid bag to the internal flow paths 405. Rotary valve 404 has also been turned to form a fluid flow path between internal flow paths 405 and inlet/outlet port 412, which leads to the drain line. The system can now pump fluid from the peritoneal dialysis fluid bag, through inlet/outlet port 411, internal fluid flow paths 405, and inlet/outlet port 412 to the drain line.

FIG. 4G shows the configuration for pumping fluid from the peritoneal dialysis fluid bag to the patient line, which can be connected to a catheter for infusion of peritoneal dialysis fluid into the patient. Rotary valve 404 has been further turned to form a flow path from the internal fluid flow paths 405 to inlet/outlet port 413, which is fluidly connectable to the patient line. Rotary valve 403 is still positioned to allow fluid from the peritoneal dialysis fluid bag into the peritoneal dialysis cassette 401, while rotary valve 402 blocks any fluid connections to or from the pre-filled bags. Peritoneal dialysis fluid can now be pumped from the peritoneal dialysis fluid bag, through inlet/outlet port 411, internal fluid flow paths 405, and inlet/outlet port 413 to the patient line.

After treatment, used peritoneal dialysis fluid can be drained from the patient using the configuration illustrated in FIG. 4H. Rotary valve 403 has been turned to form a flow path to inlet/outlet port 410, which leads to the drain line. Rotary valve 404 remains open to inlet/outlet port 413, which is fluidly connectable to the patient line. Fluid can now be pumped in the opposite direction, from the patient line, through inlet/outlet port 413 and internal fluid flow paths 405 to inlet/outlet port 410 and the drain line.

As described, the valves and pump can be operated by a control system in communication with the valves and pump. The control system can turn the valves to create flow paths between the components for each step in the treatment of a patient, or for cleaning and disinfection of the system.

One skilled in the art will understand that various combinations and/or modifications and variations can be made in the described systems and methods depending upon the specific needs for operation. Various aspects disclosed herein may be combined in different combinations than the combinations specifically presented and accompanying drawings. Moreover, features illustrated or described as being part of an aspect of the disclosure may be used in the aspect of the disclosure, either alone or in combination, or follow a preferred arrangement of one or more of the described elements. Depending on the example, certain acts or events of any of the processes or methods described herein may be performed in a different sequence, may be added, merged, or left out altogether (e.g., certain described acts or events may not be required to carry out the techniques). In addition, while certain aspects of this disclosure are described as performed by a single module or unit for purposes of clarity, the techniques of this disclosure may be performed by a combination of units or modules associated with, for example, a medical device.

What is claimed is:

1. A peritoneal dialysis cassette, comprising:
   a housing enclosing one or more flow paths;
   one or more rotary valves configured to transfer fluid therethrough,
      wherein the one or more rotary valves are configured to selectively direct the fluid through the one or more flow paths;
      wherein the one or more rotary valves have a plurality of positions,
         wherein at least one of the positions is a closed position that prevents flow of the fluid through the one or more rotary valves,
      wherein the one or more rotary valves each contain two openings on opposite sides of each valve of the one or more rotary valves, the two openings defining a single flow path disposed through each valve of the one or more rotary valves,
   wherein an upper flow path of the one or more flow paths is configured to fluidly connect to the single flow path disposed through each valve of the one or more rotary valves along a larger arc adjacent to each valve of the one or more rotary valves than an arc adjacent to each valve of the one or more rotary valves to fluidly connect to a plurality of lower flow paths of the one or more flow paths.

2. The peritoneal dialysis cassette of claim 1, wherein the one or more flow paths fluidly connect at least two inlet/outlet ports; the one or more rotary valves selectively directing the fluid through the one or more flow paths from a first specified inlet/outlet port of the at least two inlet/outlet ports to a second specified inlet/outlet port of the at least two inlet/outlet ports.

3. The peritoneal dialysis cassette of claim 2, wherein the at least two inlet/outlet ports are disposed on a side of the housing.

4. The peritoneal dialysis cassette of claim 2, wherein the at least two inlet/outlet ports are disposed on a first rigid surface of the dialysis cassette.

5. The peritoneal dialysis cassette of claim 1, wherein the housing comprises a first rigid surface and a second rigid surface.

6. The peritoneal dialysis cassette of claim 5, wherein the first rigid surface is connected to the second rigid surface by any combination of ultrasonic welding, hot plate welding, laser welding and adhesive.

7. The peritoneal dialysis cassette of claim 1, further comprising at least one opening in the housing for a membrane of a pressure sensor; the at least one opening in at least one of the one or more flow paths.

8. A system, comprising:
   the peritoneal dialysis cassette of claim 1,
   one or more servo motors insertable into the one or more rotary valves.

9. The system of claim 8, wherein the one or more servo motors are controlled to selectively direct the fluid through the one or more flow paths.

10. The system of claim 8, wherein the one or more rotary valves comprise at least two rotary valves; each of the at least two rotary valves each engageable with a separate servo motor of the one or more servo motors.

11. The system of claim 8, further comprising a temperature sensor.

12. The peritoneal dialysis cassette of claim 1, wherein the one or more rotary valves includes a flow director seal to prevent the fluid from leaking into unintended flow paths of the one or more flow paths.

13. The peritoneal dialysis cassette of claim 1, wherein the one or more rotary valves is three rotary valves.

14. The peritoneal dialysis cassette of claim 1, wherein the housing includes a window configured to allow a temperature sensor to measure a temperature of the fluid.

15. The peritoneal dialysis cassette of claim 1, further including:
   eight inlet/outlet ports fluidly connected to the one or more flow paths, wherein the inlet/outlet ports permit transfer of the fluid into the dialysis cassette and out of the dialysis cassette.

\* \* \* \* \*